United States Patent [19]

Nusser

[11] Patent Number: 5,193,330

[45] Date of Patent: Mar. 16, 1993

[54] AGRICULTURAL REAPING OR HAYING MACHINE

[76] Inventor: Josef Nusser, 7963 Eichstegen, Fed. Rep. of Germany

[21] Appl. No.: 573,047

[22] PCT Filed: Mar. 14, 1989

[86] PCT No.: PCT/EP89/00268

§ 371 Date: Sep. 7, 1990

§ 102(e) Date: Sep. 7, 1990

[87] PCT Pub. No.: WO89/08380

PCT Pub. Date: Sep. 21, 1989

[30] Foreign Application Priority Data

| Mar. 14, 1988 | [DE] | Fed. Rep. of Germany | 3808423 |
| Mar. 29, 1988 | [DE] | Fed. Rep. of Germany | 3810634 |
| Oct. 18, 1988 | [DE] | Fed. Rep. of Germany | 3835366 |
| Oct. 18, 1988 | [DE] | Fed. Rep. of Germany | 3835367 |

[51] Int. Cl.$^5$ .................... A01D 34/63; A01D 78/12
[52] U.S. Cl. .......................................... 56/6; 56/367; 56/372; 56/396; 56/DIG. 3
[58] Field of Search ............... 56/6, 15.9, 16.1, 367, 56/372, 377, 380, 396, DIG. 3, DIG. 10

[56] References Cited

U.S. PATENT DOCUMENTS

| 3,910,019 | 10/1975 | Schlittler | 56/367 |
| 4,026,093 | 5/1977 | Knusting | 56/370 |
| 4,203,277 | 5/1980 | Kaetzel | 56/377 |
| 4,218,865 | 8/1980 | Chaumont et al. | 56/15.8 X |
| 4,286,423 | 9/1981 | Caldwell et al. | 56/6 |
| 4,301,643 | 11/1981 | Bailey et al. | 56/6 X |
| 4,343,138 | 8/1982 | Neuerburg | 56/DIG. 10 X |

FOREIGN PATENT DOCUMENTS

| 0116661 | 8/1984 | European Pat. Off. |
| 1202554 | 10/1965 | Fed. Rep. of Germany |
| 1457953 | 7/1970 | Fed. Rep. of Germany |
| 1782238 | 7/1971 | Fed. Rep. of Germany |
| 2143315 | 3/1973 | Fed. Rep. of Germany |
| 2653974 | 6/1978 | Fed. Rep. of Germany |
| 2833814 | 2/1980 | Fed. Rep. of Germany |
| 3151481 | 7/1983 | Fed. Rep. of Germany |
| 8631593 | 2/1988 | Fed. Rep. of Germany |
| 1499066 | 10/1967 | France |
| 1566084 | 5/1969 | France |
| 1568923 | 5/1969 | France |
| 2091325 | 1/1972 | France |
| 2189990 | 1/1974 | France |
| 2232980 | 1/1975 | France |
| 2414863 | 8/1979 | France |
| 299716 | 8/1965 | Netherlands |
| 399041 | 3/1966 | Switzerland |
| 2007958 | 5/1979 | United Kingdom |
| 2052237 | 1/1981 | United Kingdom |

Primary Examiner—Terry Lee Melius
Attorney, Agent, or Firm—Wallenstein, Wagner & Hattis, Ltd.

[57] ABSTRACT

In a reaping machine (11) having one or more rotatably drivable mowing units (12) which are provided with working implements, the mowing units (12) being held on a support frame (13) held with the tractor, the mowing units (12) are pivotally supported on the support frame (13) for easy moving adaptation of the working implements to the surface of the ground in the immediate working region by means of one or more compensating means (A2). Furthermore, the pivot axes (M) of the compensating means (A2) are arranged extending in the travelling direction and/or transversely thereof and/or inclined substantially in the vertical plane or intersect each other or the compensating means consist of a ball joint. In addition, the compensating means (A2) is configured in such a manner that at least one pivot axis (M) extending transversely of the travelling direction lies in the vicinity of the surface of the ground (10). With this configuration a quick-reacting adaptation of the working implements to the particular ground profile is obtained, said implements remaining constant at the intended working height over the entire working width.

18 Claims, 14 Drawing Sheets

AGRICULTURAL REAPING OR HAYING MACHINE

TECHNICAL FIELD OF THE INVENTION

The technical field of the invention is agricultural machinery.

BACKGROUND OF THE INVENTION

The invention relates to a reaping or haying machine comprising at least one rotatingly drivable mowing or raking unit which is provided with implements constructed as mowing blades or as raking tines and defining a working plane and by means of a compensating means is supported on a support frame connectable to a tractor pivotally about a pivot axis extending transversely of the travelling direction.

Agricultural machines of this type are known in a large number of different configurations. The mowing or raking units are attached to or installed on a tractor. To enable an adaptation to the particular terrain profile in operation, the mowing or raking unit to which the working implements are attached is supported articulately at the tractor at a relatively great height in pronounced cantilever manner. Pitch movements occurring due to braking, accelerating or travelling over uneven ground have disadvantageous effects on the working result and the mowing or raking unit because the latter can be forced into an unfavourable position by the tractor. This leads to high moments about a transverse axis; said moments are further intensified by the high articulation on the tractor and for example in machines with a three-wheel or four-wheel chassis can lead to the front wheels being more highly loaded than the rear wheels. This applies analogously also to mowing or raking units provided with a slide plate.

The result of this is that the mowing or raking units, in particular the working implements attached thereto exhibit the tendency to penetrate into the ground more at the front. This leads to damage to the grass sod and soiling of the crop with soil particles. Also, the working implements may be deformed and break. Moreover, ground contacts can lead to load peaks and as a result also damage to the machine; greater wear and a higher power requirement are usually inevitable.

This problem cannot be solved by strengthening the construction. Apart from the greater costs, a heavier construction would have the disadvantage of poor manoeuvrability of the combination and a further increase in the power requirement without improving the operating performance. Also, no increase of the travelling speed and the working width is possible.

The problem underlying the invention is therefore to provide a mowing or haying machine of the aforementioned type in which the known disadvantages are obviated. Thus, the tools should be able to be adapted in easily moving and rapid reaction at the intended working height to the particular ground profile over the entire working width. The motions of the tractor or a separate associated vehicle are not to be imparted to the mowing or raking units; on the contrary, the mowing or raking units are to be able to execute their own motions and follow the terrain profile so that the resistance to travel and the machine load are kept low and damage of the grass sod as well as damage to the working implements and soiling of the crop are to be largely avoided. The support area or the wheels of the mowing or raking unit are accordingly always to run parallel to the ground surface and ground irregularities are to be easily compensatable without pitch movements of the towing vehicle or the chassis being able to have disadvantageous effects. The constructional expenditure necessary for this is to be kept small but nevertheless a high operational reliability is to be guaranteed. It is also to be possible to easily overcome suddenly occurring obstructions.

SUMMARY OF THE INVENTION

According to the invention this is achieved in a mowing or raking machine of the type described at the beginning in that the compensating means is constructed in such a manner that a pivot axis of the mowing or raking unit lying transversely of the travelling direction extends through an instantaneous pole arranged beneath the working plane.

Embodiments of the compensating means and advantageous further developments will be apparent from the subsidiary claims.

If an agricultural reaping or haying machine is constructed according to the invention it is possible to compensate ground irregularities in the immediate region of the reaping or haying tools, irrespective of the towing vehicle and/or the support frame or chassis. Due to the articulate attachment with possibility of pivoting about the pivot axis arranged transversely according to the invention and possibly with the possibility of pivoting of the reaping or haying unit about one or more further pivot axes lying preferably likewise in the region of the working plane, the pivot movement on encountering an obstruction is such that the mowing or raking unit is pivoted up in the front region and passes over the obstruction so that the cutting blade or tines thereof are not pressed into the ground. Damage to the soil and/or the tools is thus largely eliminated and careful treatment of the crop is also ensured.

Moments caused by pitch movement of the tractor and/or the support frame and/or the chassis are compensated in this manner. Because of the adaptation of the individual mowing or raking units, effected by the machine weight, to the surface of the ground to be worked the configuration according to the invention permits high travelling speeds and large working widths so that economic use is also obtained.

BRIEF DESCRIPTION OF THE DRAWINGS

In the drawings some examples of embodiment of the agricultural reaping or haying machine constructed according to the invention and of the compensating means are shown and these will be described in detail hereinafter. In each case in schematic illustration

DESCRIPTION OF THE PREFERRED EMBODIMENTS

The drawings the reaping and haying machines illustrated, the mowing and raking units of which and the components associated directly therewith are provided respectively with the same reference numerals although the mowing and raking units are configured differently to some extent.

Figure 1:
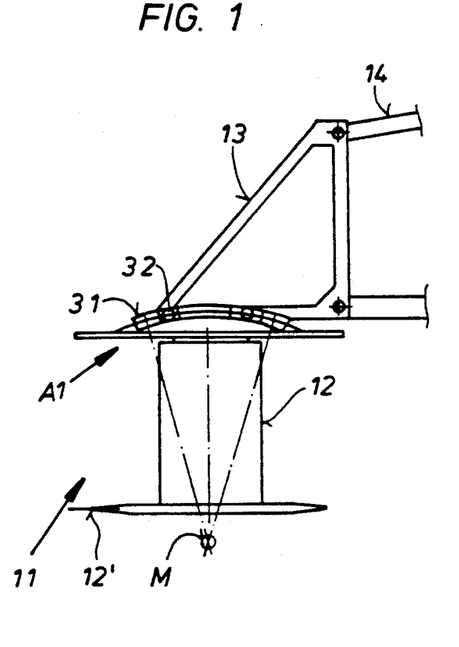
FIG. 1 shows an attachment mowing unit with a compensating means in side elevation.

According to FIG. 1 a mowing unit 12 of a reaping machine 11 equipped with a mowing blade 12' is connected by means of a compensating means A1 with a support frame 13 which is attached by means of links 14 to the front side of a tractor. The compensating means A1 comprises an arcuately curved guide path 31 in the form of a slide track in which slide bodies 32 are displaceably guided. The guide path 31 is connected to the support frame 13 but the slide bodies 32 are connected to the mowing unit 12, so that the latter is suspended pivotally about the pivot axis M formed by the geometric axis of the guide path 31. Since the pivot axis M is arranged beneath the support surface of the mowing unit 12, when an obstacle is encountered during forward drive said unit undergoes a right-turning moment so that it is relieved of weight at the front side and is easily moved over an obstacle.

Figure 2:
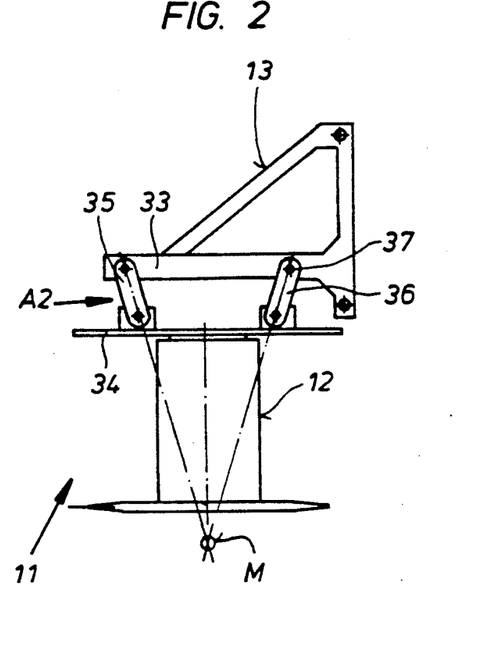
FIG. 2 shows the attachment mowing unit according to FIG. 1 with a compensating means of different type, in side elevation.

In the example of embodiment according to FIG. 2 the compensating means A2 is constructed as four-bar linkage comprising a base 33, a rocker 34 and links 35 and 36 which are articulately connected by means of bolts 37 to the support frame 13 and the mowing unit 12. The instantaneous center of rotation of the four-bar linkage determines the pivot axis M.

Figure 3:
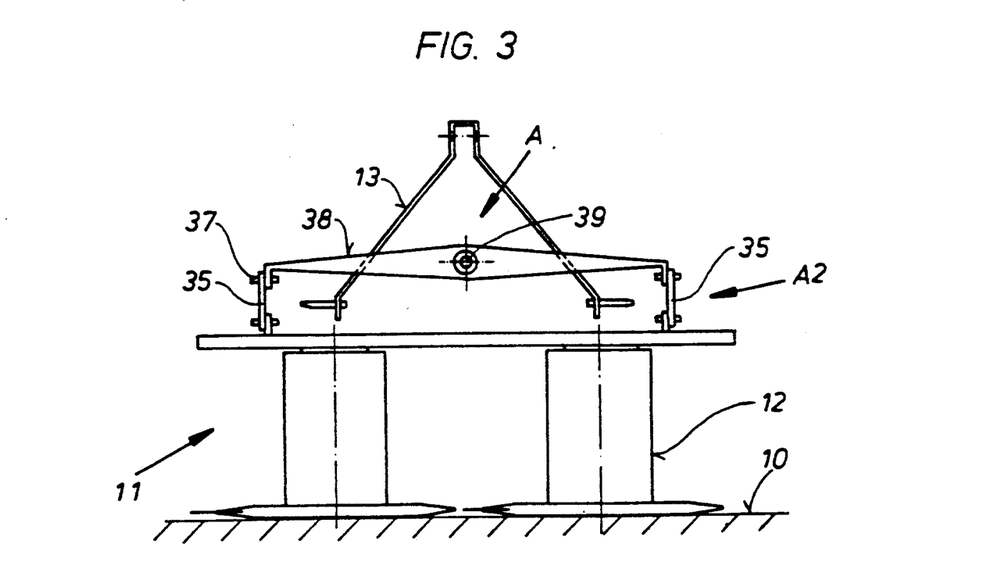
FIG. 3 shows an attachment mowing means provided with two compensating means, in rear view.

Apart from the compensating means A2 according to FIG. 2, the reaping machine according to FIG. 3 is also provided with a further compensating means A which is formed by a shaft 39 on which a crossbeam 38 is suspended on which two mowing units 12 are held via the compensating means A2. Thus, a ground adaptation is possible about a transverse pivot axis as in FIG. 2 and a longitudinally extending pivot axis.

Figure 4:
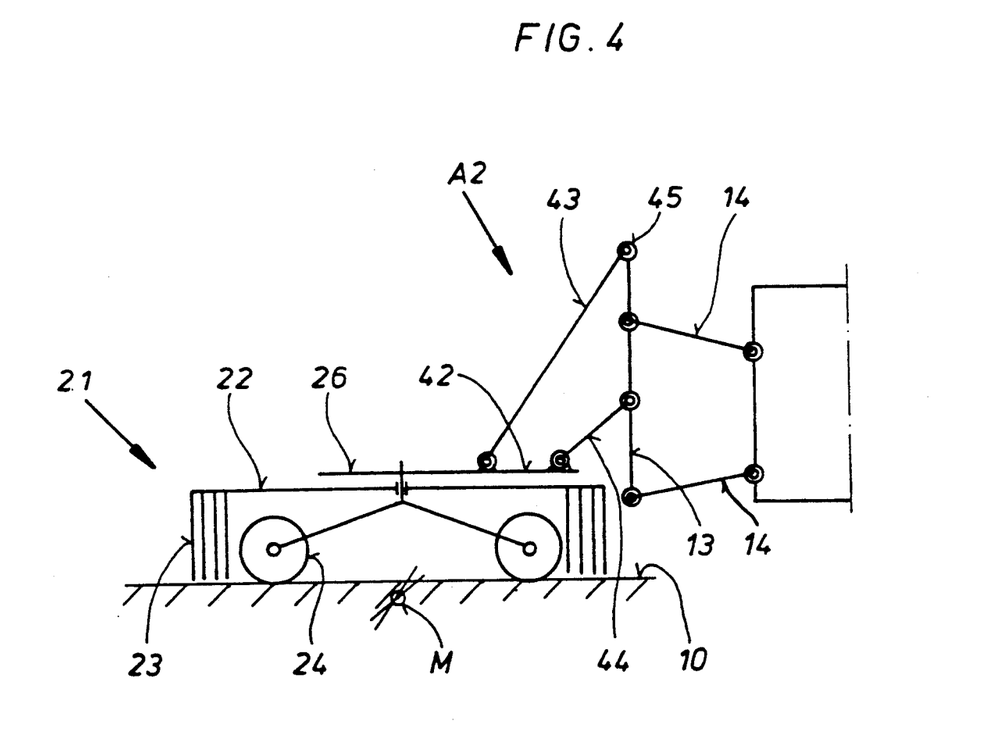
FIG. 4 shows a haying machine with compensating means, in side elevation.

FIG. 4 shows a haying machine 21 having a raking unit 22 which is provided with raking tines 23 and is supported by means of a chassis 24 on the ground. The raking unit 22 is rotatably mounted on a machine frame 26 which is connected via a compensating means A2 to a support frame 13 secured to links 14. One part of the support frame 13 forms the base of a four-bar linkage, one part 42 of the machine frame 26 the rocker and the links 43, 44 establish the connection between the two. The extensions of the links 43, 44 intersect in the transverse pivot axis M.

Figure 5:
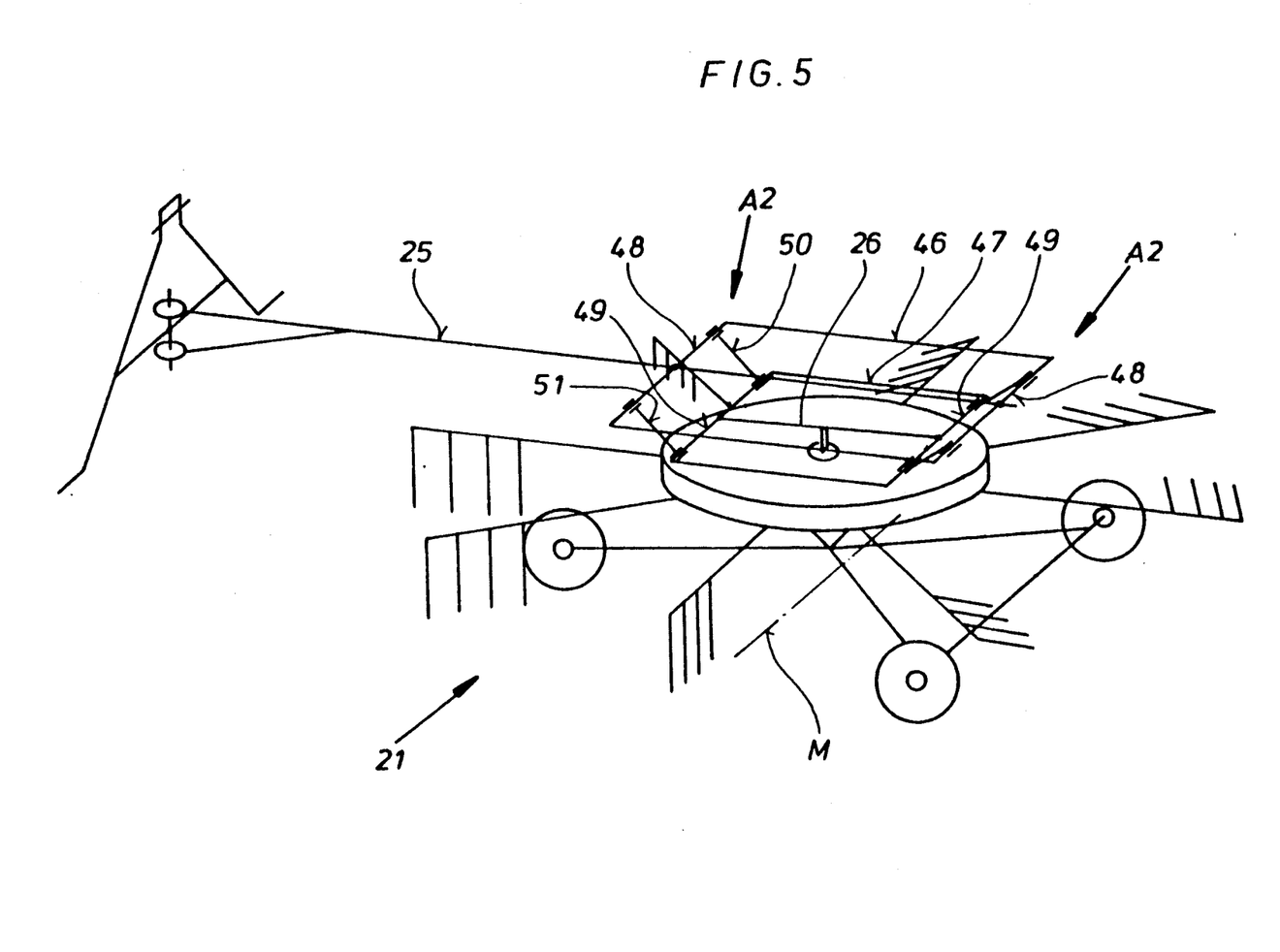
FIG. 5 shows a haying machine with compensating means of different type, in perspective view.

The haying machine 21 according to FIG. 5 is connectable by means of an unnumbered attachment yoke having vertically directed pivot axes to a tractor. Beneath a machine frame 26 a working implement intended for swathing is arranged which is rotatable about a substantially vertical axis and comprises tine supports with tines. Beneath the tool a three-wheel chassis is secured to the machine frame 26.

The support frame 25 comprises two transverse legs 48; the machine frame 26 likewise has two such legs 49. The free ends of the legs 48, 49 are connected to each other via links 50, 51 rotatable thereabout and thus form a four-bar linkage as compensating means A2 having a base 46 belonging to the support frame 25 and a rocker 47 associated with the machine frame 26. The imaginary extensions of the links 50, 51 of the four-bar linkage each meet at a point, the instantaneous pole, by which the transverse pivot axis M is defined. In the event of ground unevenness the mowing unit 21 can rotate about the transverse pivot axis M relatively to the support frame 25 so that the machine frame 26 can adapt itself largely independently of the tractor to bumps.

Figure 6:
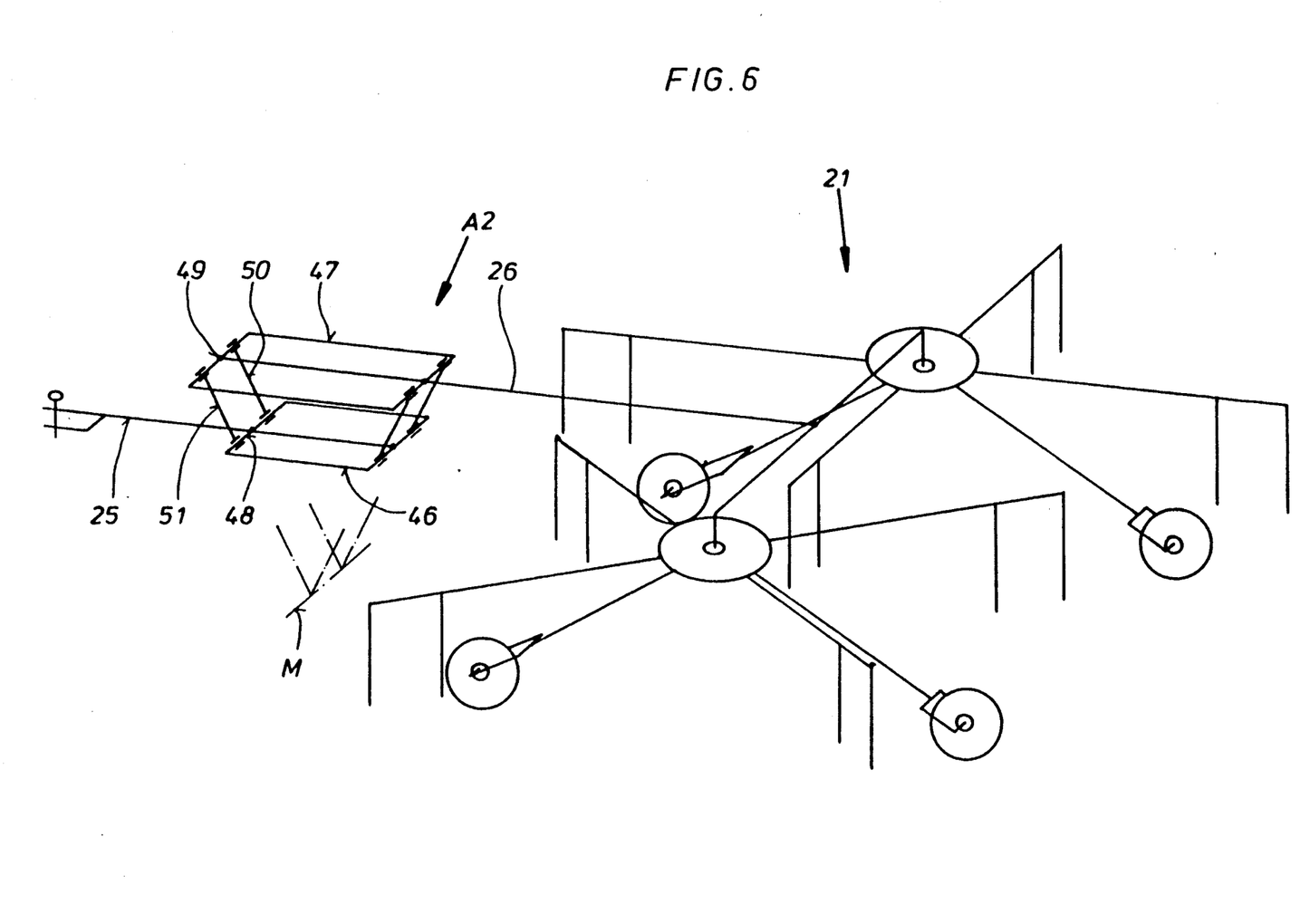
FIG. 6 shows a haying machine provided with two raking units and compensating means integrated into the pulling mechanism, in perspective view.

In FIG. 6 a drawn twin-circle machine 21 with a four-wheel chassis is shown. The left and the right wheel pairs are each disposed beneath a tool. The support frame 25 is constructed as drawbar. An analogous compensating means A2 like in FIG. 5 is arranged between the support frame 25 and the machine frame 26. A difference resides in that the support frame 25 in this case is disposed beneath the machine frame 26. Here as well, the working tools can pivot relatively to the support frame 25 about a pivot axis M lying transversely arranged beneath the support frame 25 and the machine frame 26 and thus adapt themselves to irregularities of the ground.

Figure 7:
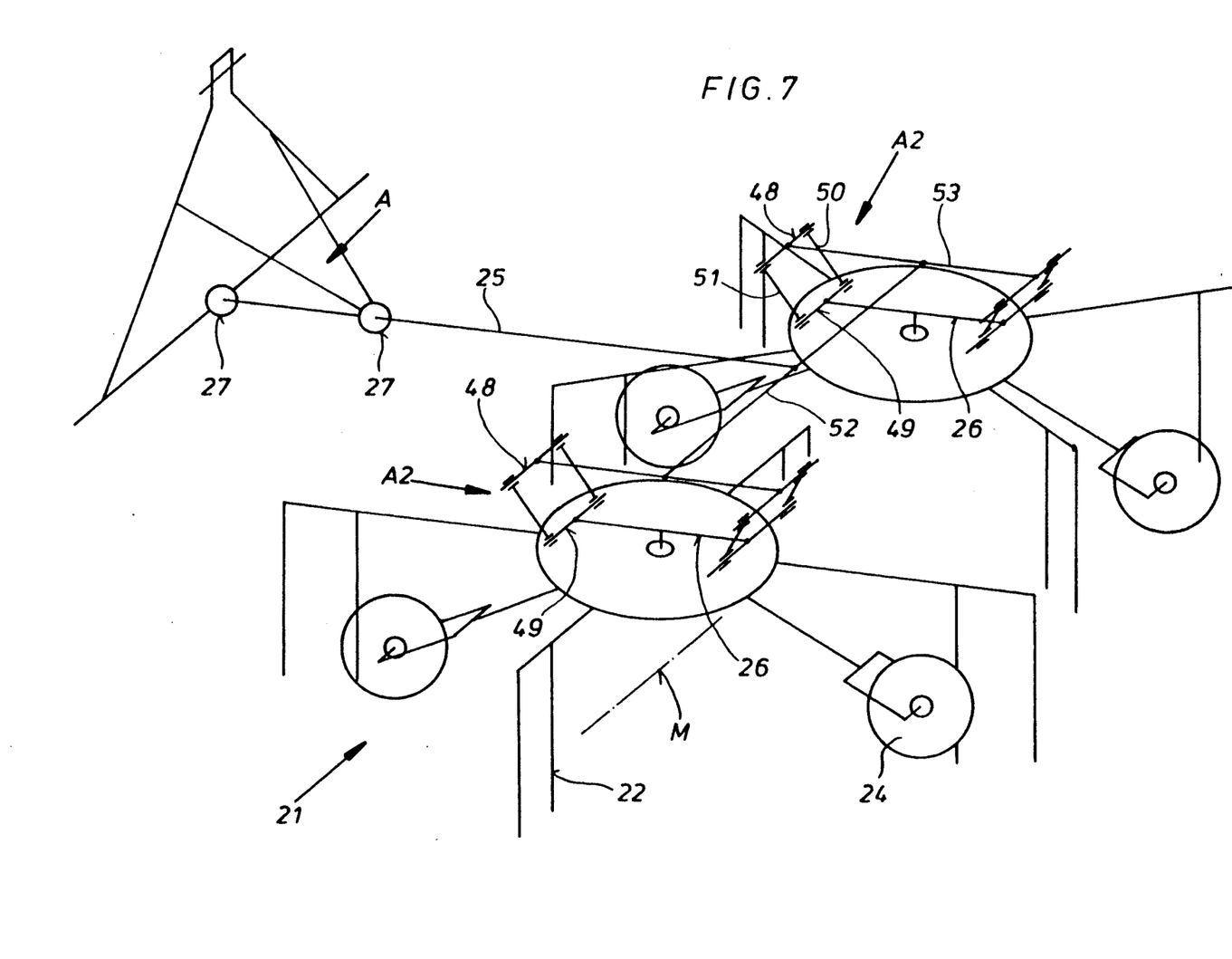
FIG. 7 shows the haying machine according to FIG. 6 with compensating means associated with the raking units.

The haying machine 21 according to FIG. 7 comprises two independently drivable raking units 22 which together with a chassis 24 are mounted on a machine frame 26. A support frame 25 is rotatably mounted at its front end in a bearing pedestal equipped with bearings 27 thereby creating a compensating means A. The support frame 25 comprises a transverse crossbeam 52 having brackets 53 lying in the longitudinal direction. The latter comprise transversely disposed legs 48 and legs 49 are attached to the machine frame 26. The latter legs are connected rotatably via links 50, 51 to the legs 48. In this manner, once again four-bar linkages are formed as compensating means A2 in such a manner that the raking units 22 and the chassis 24 are pivotal about a pivot axis M transversely disposed below them.

Figure 8:
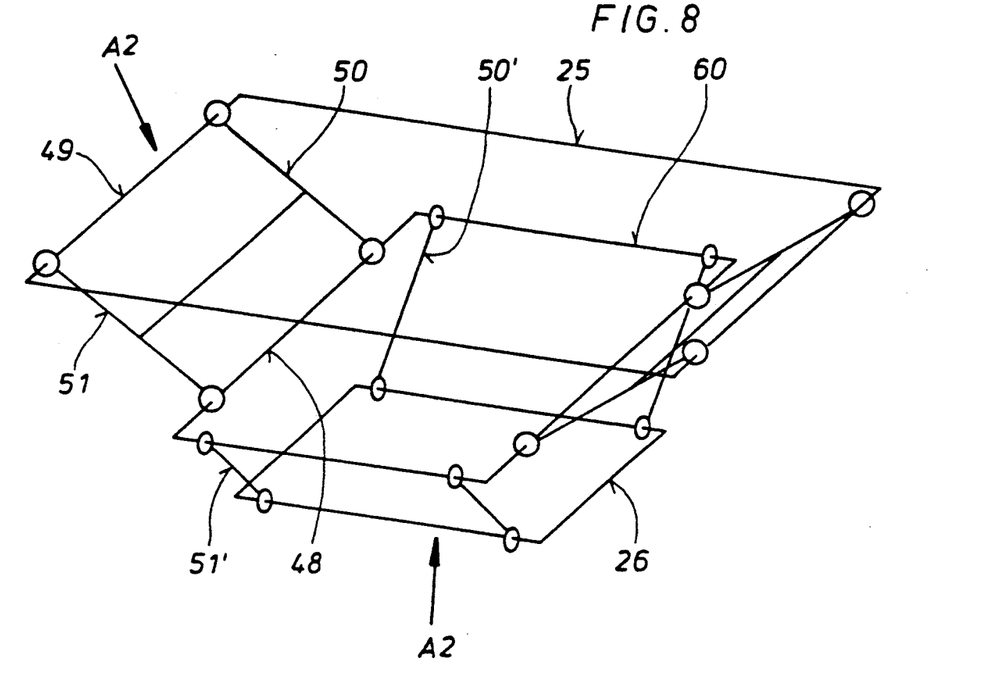
FIG. 8 shows a compensating means for a longitudinal and transverse axis in perspective view.

In FIG. 8 two schematically illustrated compensating means A2 are combined via an intermediate frame 60 to enable longitudinal and transverse movements to be compensated. A horizontal support frame 25 represents the base and an intermediate frame 60, the rocker for the upper four-bar linkage which comprises articulately mounted links 50 at the support frame 25 and at the intermediate frame 60 and the instantaneous center or rotation of which lies in the point of intersection of the straight line extensions of the links 50, 51 and defines a pivot axis, for example a longitudinal axis. Via the articulate connection to the intermediate frame 60 and to the machine frame 26 further links 50', 51' establish the connection between the two. A further four-bar linkage is thereby formed, the instantaneous center of rotation of which extends in the point of intersection of the straight line extension of the links 50', 51', and defines a transverse axis. This arrangement is such that the pivot axes intersect substantially at right-angles.

Figure 9:
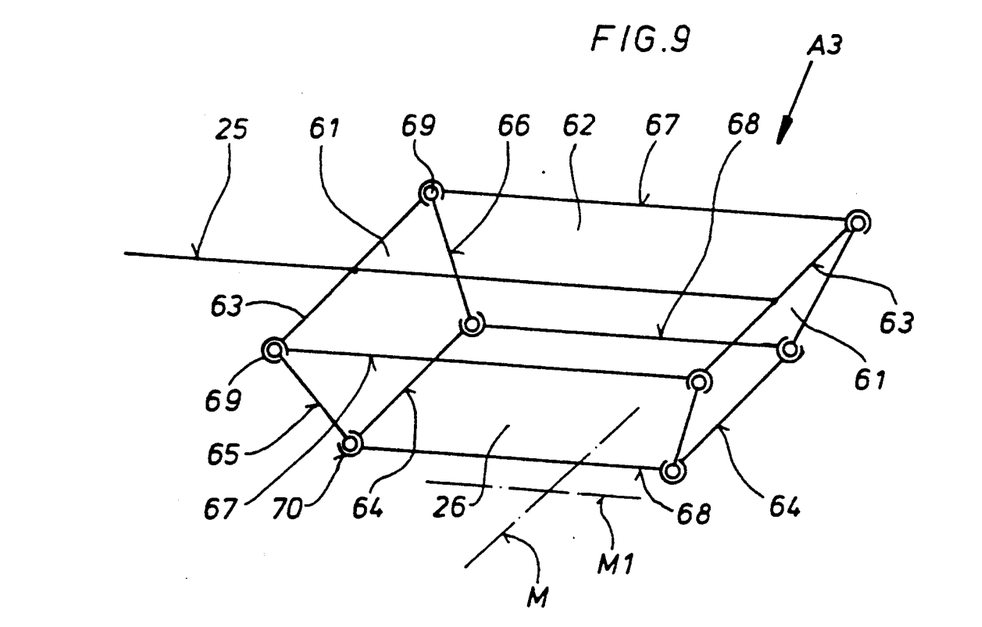
FIG. 9 shows a compensating means constructed as three-dimensional link mechanism and operative about two axes, in perspective view.

In FIG. 9 a compensating means A3 formed as three-dimensional link mechanism is illustrated. Pivot movements are also possible here both about a pivot axis M1 and about a pivot axis M. Transverse legs 63 belonging to the support frame 25 have end points 69 constructed as ball joints and representing the corners of a (imaginary) quadrilateral. Transverse legs 64 belonging to the machine frame 26 also have end points 70 constructed as ball joints and forming the corners of a smaller quadrilateral. The end points 69 are each connected via links 65, 66 articulately to an end point 70. The transverse legs 63 and 64 and the links 65 and 66 form inclined trapeziums 61 the planes of which intersect in the extension downwardly in a straight line which forms a transverse pivot axis M. Likewise, the longitudinal legs 67, 68 and the links 65, 66 form trapeziums 62 the planes of which intersect in extension downwardly in a longitudinally extending pivot axis M1.

Figure 10:
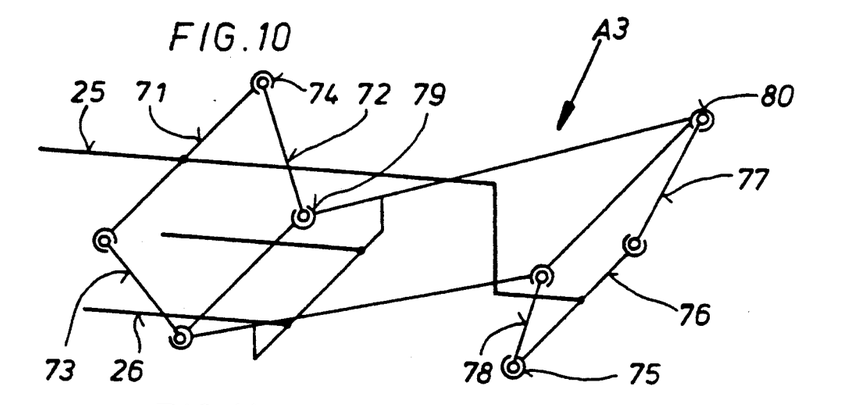
FIGS. 10 to 14 show further embodiments of compensating means.

In FIG. 10 a compensating means A3 formed by a three-dimensional link mechanism is shown. Two links 72, 73 converging downwardly are articulately connected in ball-joint manner to a leg 71 associated with the support frame 25 at articulation points 74 and two links 77, 78 diverging upwardly are articulately connected in ball-joint manner at articulation points 75 of a leg 76 likewise associated with the support frame 25. With their free ends the links 72, 73 and 77, 78 are likewise articulately connected in ball-joint manner at articulation points 79 or 80 of the machine frame 26 and thus establish the connection between the support frame 25 and the machine frame 26. The upper articulation points 74, 80 represent the corner points of an imaginary quadrilateral which is larger than the smaller imaginary quadrilateral which lies therebelow and the corner points of which are defined by the lower articulation points 75, 79 so that the links comprise two pivot axes lying beneath the compensating means A2 of which the one extends longitudinally and the other transversely.

Figure 11:
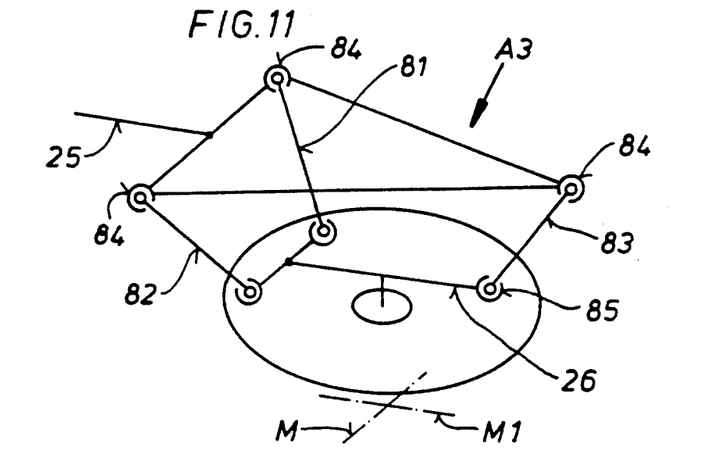

FIG. 11 likewise shows a compensating means A3 constructed as three-dimensional link mechanism and having three links 81, 82, 83 which are articulately connected in ball-joint manner at articulation points 84 of the support frame 25 representing corner points of a triangle and converge downwardly. By ball-joint articulation at the articulation points 85 associated with the machine frame 26 and representing the corner points for a smaller triangle the support frame 25 is connected to the machine frame 26. In simple manner this configuration permits pivot movements for example about the pivot axes M and M1 of which the one extends longitudinally and the other transversely.

Figure 12:
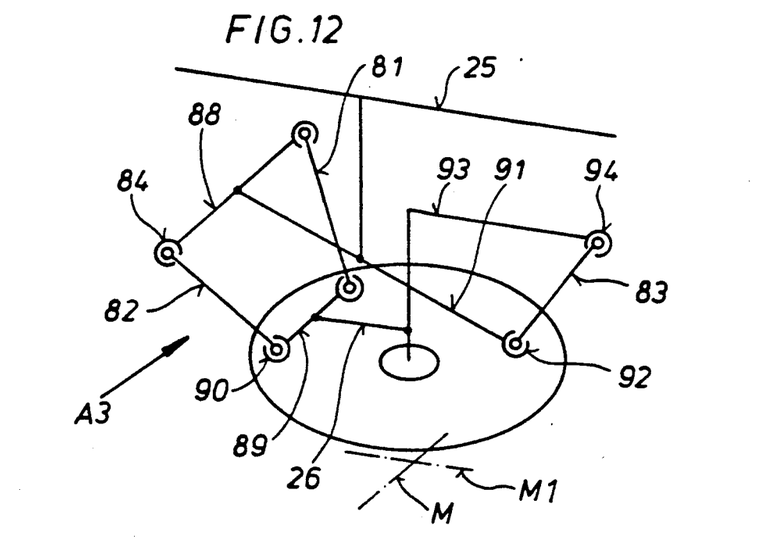

FIG. 12 shows a compensating means A3 similar to that in FIGS. 10 and 11. The support frame 25 here comprises at its lower part an inclined extending crossbeam 91, the upper end of which terminates at a leg 88 and at the end of which articulation points 84 are disposed. A further articulation point 92 is disposed at the lower end of the crossbeam 91. The articulation points 84 and 92 are associated with the support frame 25. Two articulation points 90 associated with the machine frame 26 are disposed at the ends of a leg 89 forming a unit with the machine frame 26. At the end of an arm 93 connected to the machine frame 26 a further articulation point 94 is disposed. By the ball-joint articulation of the links 81, 82, 83 connecting the articulation points 84, 90 and 92, 94 the support frame 25 is connected to the machine frame 26. The path of the pivot axes M, M1 is similar to FIG. 11.

Figure 13:
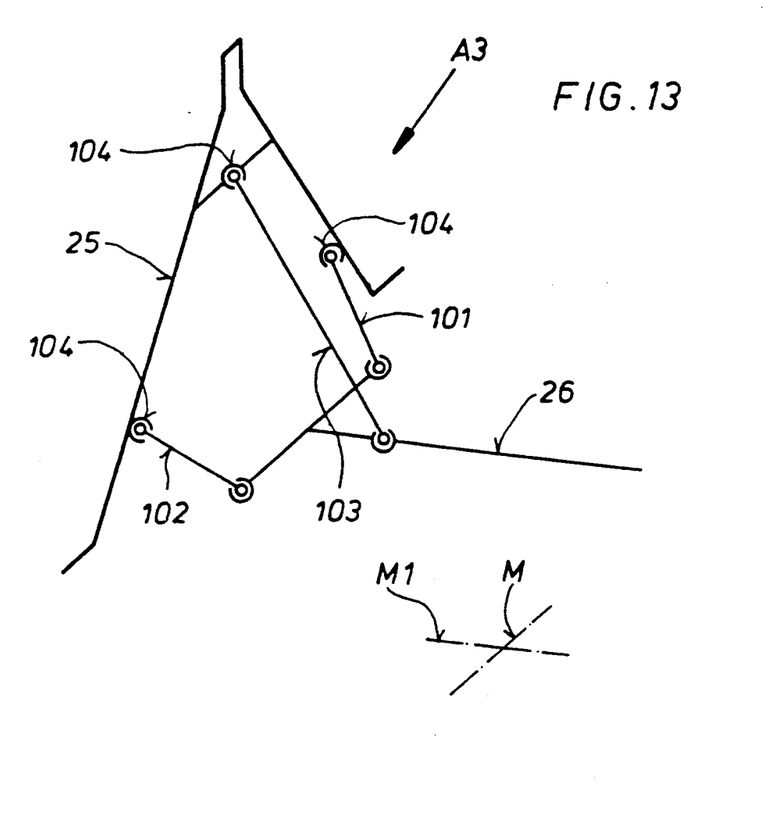

In FIG. 13 a further compensating means A3 configured as three-dimensional link mechanism is illustrated. The support frame 25 constructed here as attachment yoke and the machine frame 26 each have three articulation points 104 to which links 101, 102, 103 are articulately connected in ball-joint manner and connect the support frame 25 to the machine frame 26. This configuration also permits pivot movements about the pivot axes M and M1, the transversely directed pivot axis M lying in the intersection point of the straight line extension of the link 103 with the plane of the links 101, 102. The longitudinally disposed pivot axis M1 is defined by the intersection point of the straight line extensions of the links 101, 102.

Figure 14:
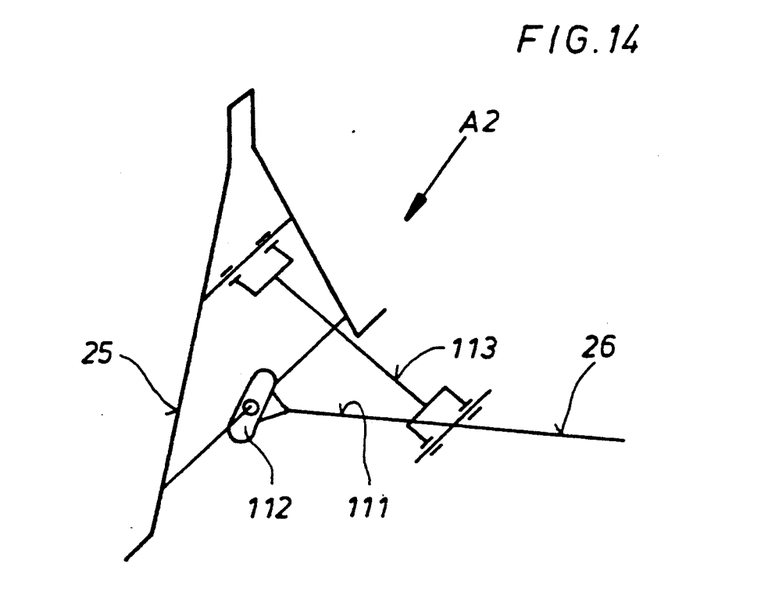

In FIG. 14 the support frame 25 again constructed as attachment yoke is connected via a link 113 and an arcuate thrust joint 112 to the part of the machine frame 26 constructed as rocker 111. The straight line extensions of the link 113 and the radii (path normals) of the thrust joint 112 intersect in the instantaneous center of rotation and thus in the pivot axis and consequently a compensating means A2 with transverse pivot axis below the machine frame 16 is again obtained.

Figure 15:
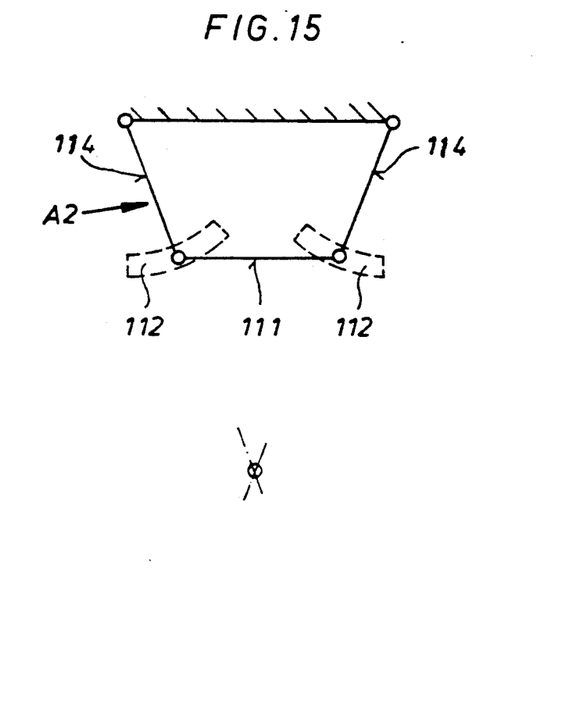
FIGS. 15 to 23 show compensating means constructed as four-bar linkage in various embodiments.

The individual members or joints of a four-bar linkage may be made differently corresponding to the conditions set. Thus, for example, in FIG. 15 the links 114 can be replaced by the arcuate thrust joint 112 drawn in dashed line, the radii (path normals) corresponding to the straight lines of the links 114.

Figure 16:
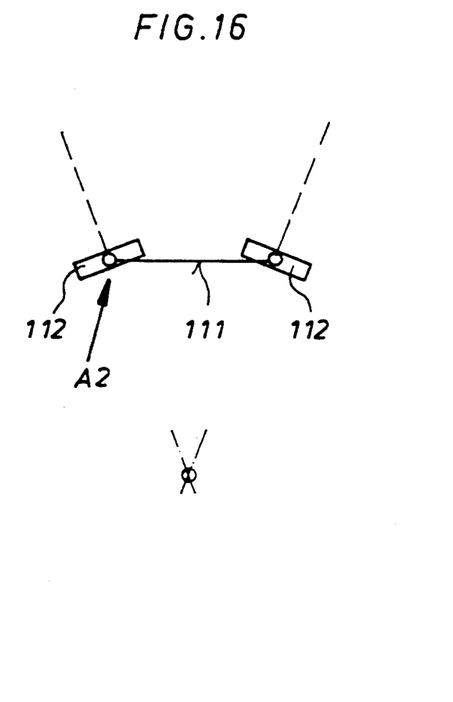

FIG. 16 shows as substitute for the links 114 thrust joints 112 with straight slide guides, the path normals of which intersect in the instantaneous center of rotation.

Figure 17:
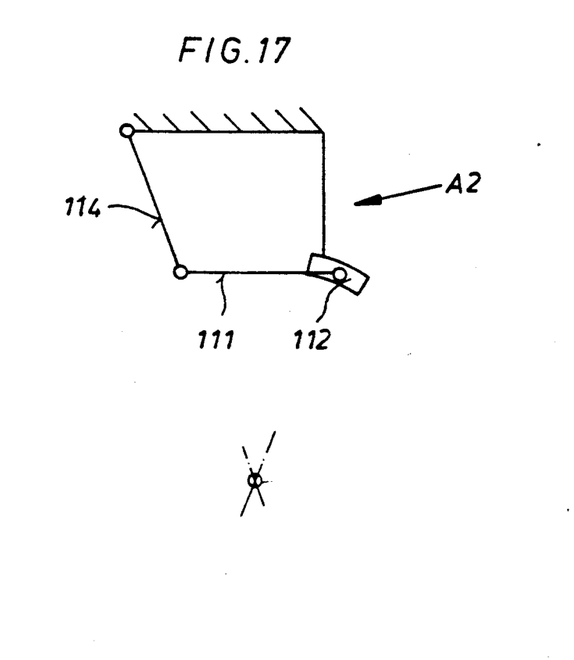
Figure 18:
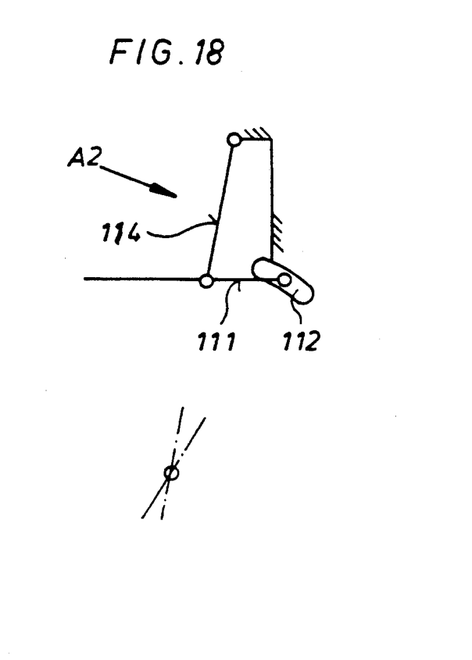

In FIG. 17 only one link is replaced by an arcuate thrust joint 112, the radii of which intersect the straight line extension of a link 114 in the instantaneous center of rotation. FIG. 18 shows a similar configuration.

Figure 19:
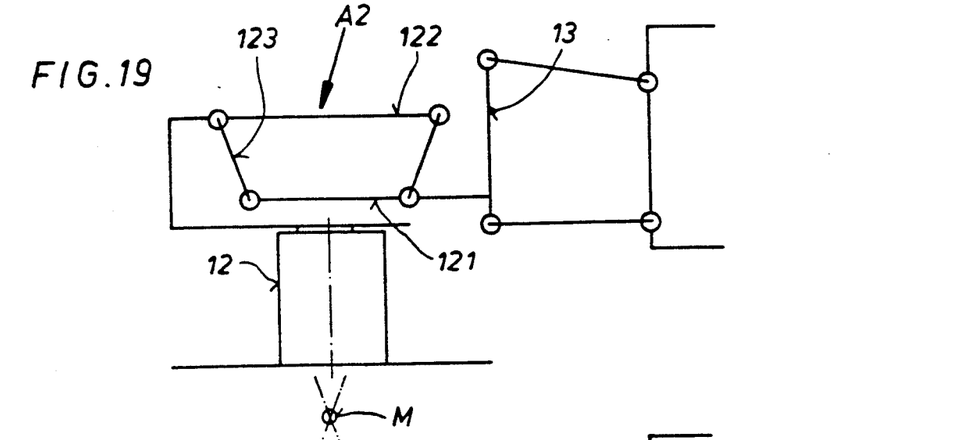

Furthermore, in FIGS. 19 to 23 different configurations of four-bar linkages are shown as compensating means A2, each having a transverse pivot axis M arranged beneath the working plane of a reaping or haying unit 12. In FIG. 19 the base 121 connected to the support frame 13 is arranged beneath the rocker 122 carrying the mowing unit 12 and connected via links 123; the extensions of which intersect in the instantaneous center of rotation through which the transverse pivot axis M extends. The base 121 here is dimensioned smaller than the rocker 122.

Figure 20:
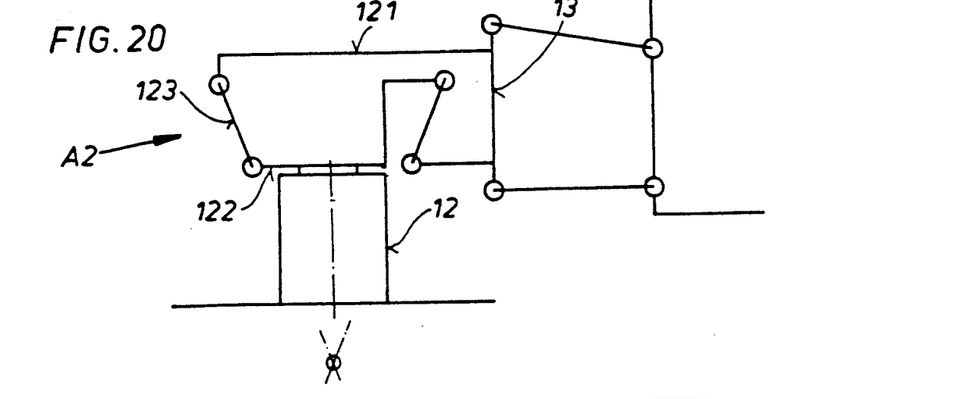

In accordance with FIG. 20 the base 121 is arranged above the rocker 122 and is made larger than the latter.

Figure 21:
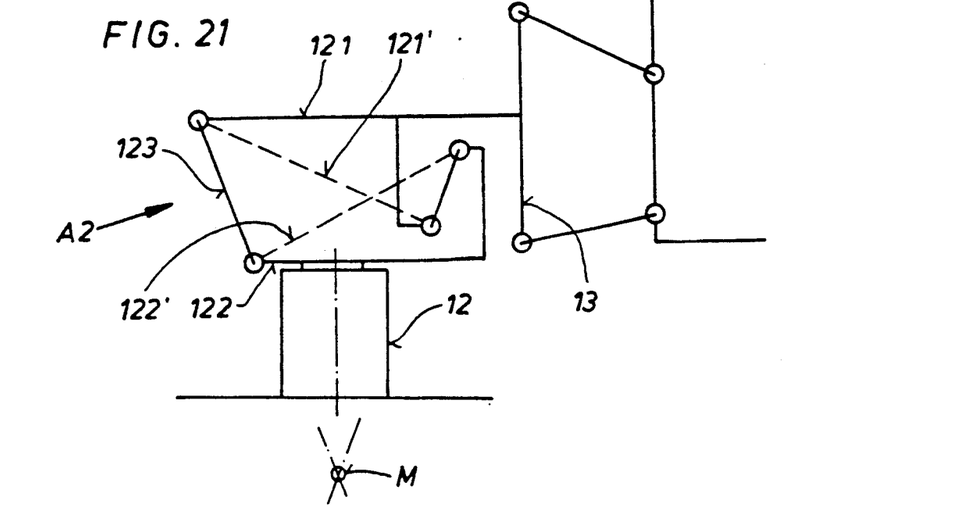

In FIG. 21 the dot-dash drawn ideal connecting line 121' of the joints intersects at the base 121 the ideal connecting line 122' of the joints at the rocker 122.

Figure 22:
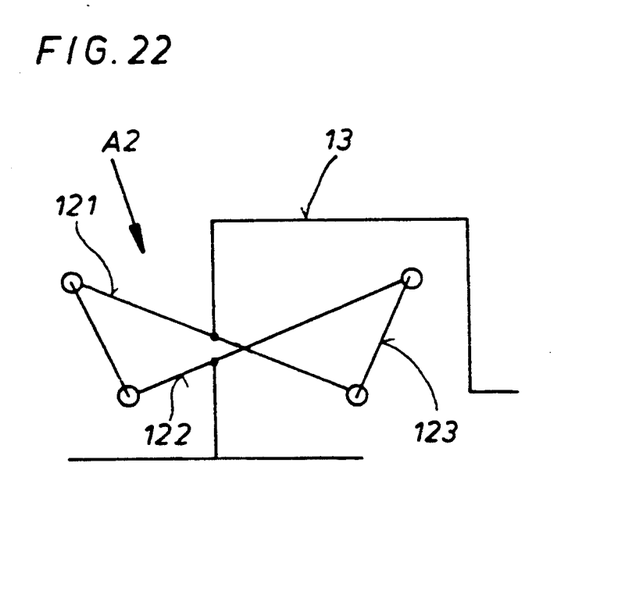

FIG. 22 shows a compensating means A2 in which the base 121 and the rocker 122 intersect.

Figure 23:
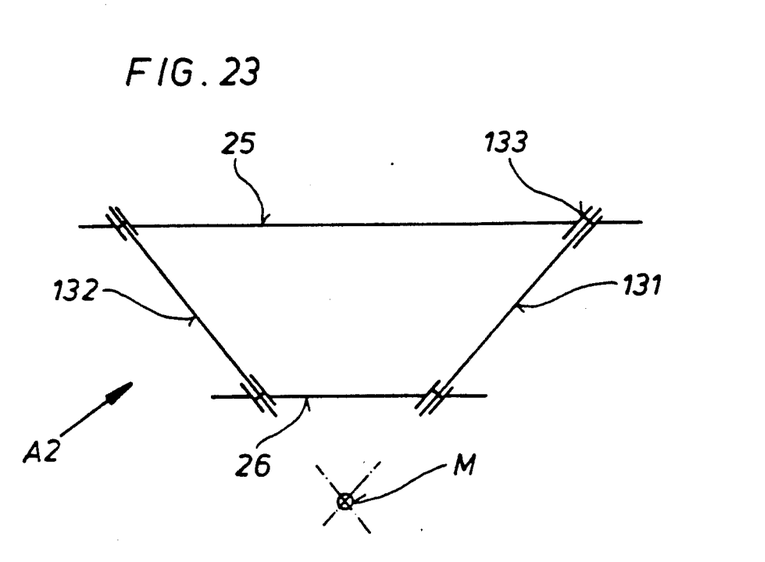

In the compensating means A2 according to FIG. 23 two links 131, 132 connected to the support frame 25 as base and to the frame 26 as rocker are formed as leaf springs and clamped at the coupling points 133.

Figure 24:
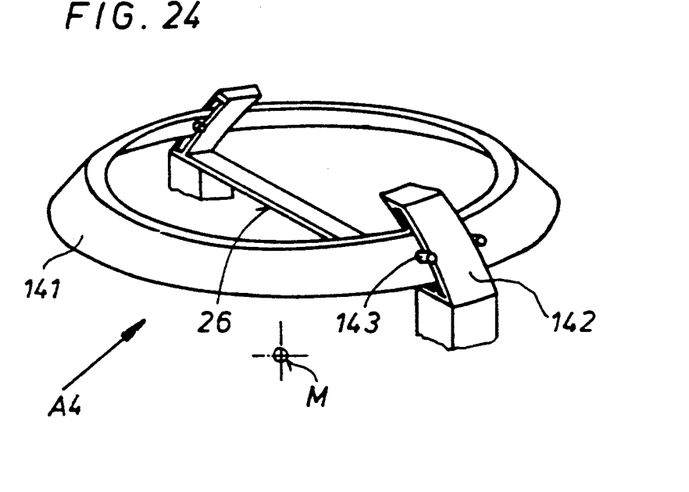
FIG. 24 shows a compensating means constructed as ball joint, in perspective view.

In FIG. 24 a compensating means A4 is illustrated which is pivotal spherically about any geometrical axes extending through a virtual pivot point, including a transversely disposed pivot axis M. On the support frame a ball segment 141 is disposed on which slide pieces 142 connected to the machine frame 26 of a raking or mowing unit are displaceably arranged. By pins 143 rotation about a perpendicular axis is prevented; instead of the pins, springs may also be provided as stops. The slide pieces 142 may be replaced by rollers or balls.

Figure 25:
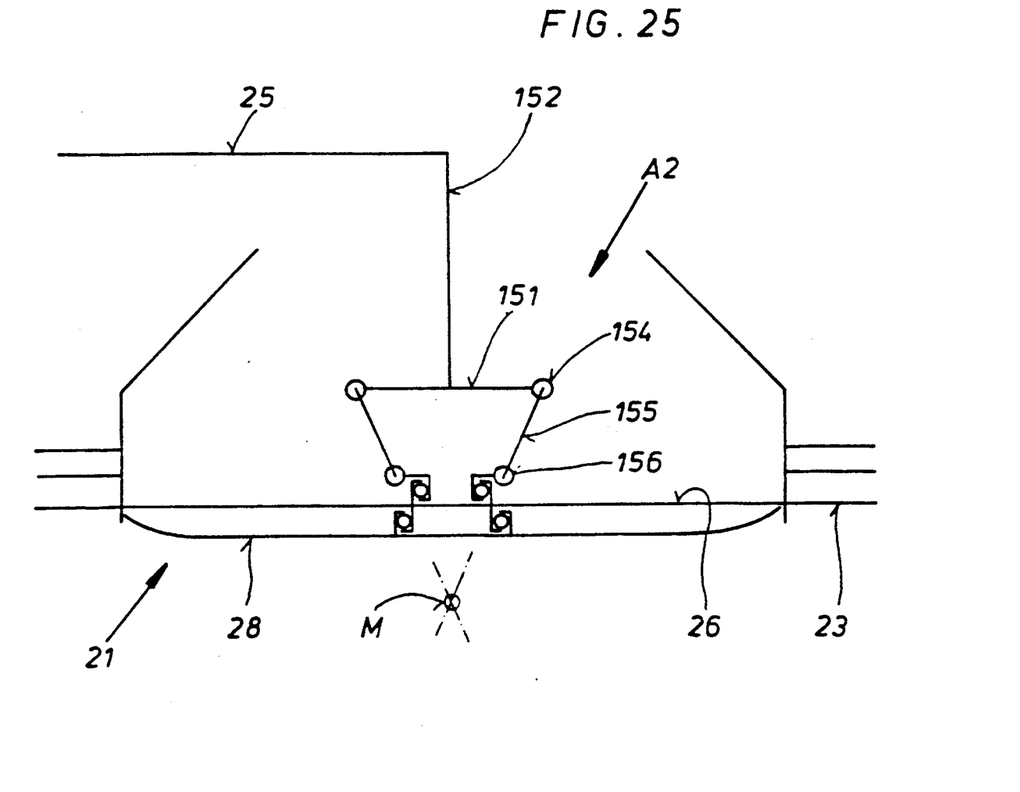
FIG. 25 shows a compensating means equipped with ball joints with a haying machine in side view.

In FIG. 25 a haying machine 21 is illustrated and comprises a pot-shaped tool 23. A vertical arm 152 of the support frame 25 terminates in a plate 151 comprising articulation points 154. On the machine frame 26 there are articulation points 156 which are connected via links 155 to articulation points 154. This creates a compensating means A2 with pivotability about a transverse pivot axis M disposed beneath the plate 151; in addition, there may be pivotability about a second axis. In contrast to the haying machines according to FIGS. 4 to 7, in this case instead of a chassis a slide plate 28 is present which effects the supporting and guiding of the haying machine 21 on the ground.

Figure 26:
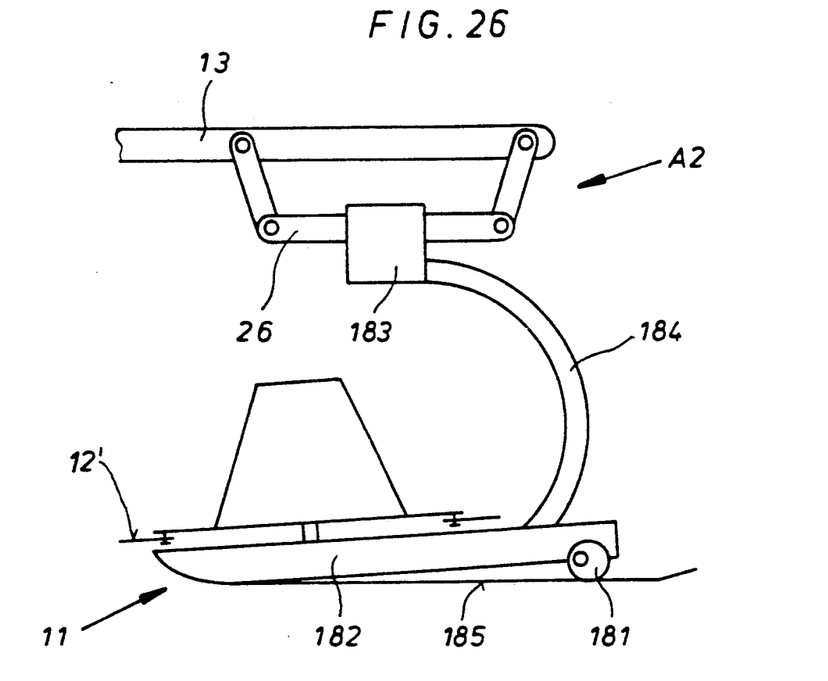
FIG. 26 shows an adjustable disc mowing unit with compensating means.

In FIG. 26 a disc mowing unit or rotary cutter is shown in side view and comprises a compensating means A2 which permits pivoting about a transverse pivot axis. A spar 183 here is part of the machine frame 26 and is connected via an arm 184 to a crossbeam 182. The crossbeam 182 carries rotatably mounted implements with cutting blades 12'. Beneath the crossbeam 182 a slide plate 185 is disposed which in the front region of the crossbeam 182 merges into the latter. At this point the slide plate 185 is made resilient.

Between the crossbeam 182 and the slide plate 185 an angular adjustment is possible. Expediently used for this is an eccentric disc 181 mounted on the crossbeam 182. By turning the eccentric disc 181 the inclination of the rotation plane of the working implements and the cutting blades 12' with respect to the plane of the ground can be adjusted and thus the cutting height of the cutting blades. Instead of the eccentric disc 181 an adjusting spindle or the like may also be employed.

The principle of the transverse and longitudinal compensating means may also be applied to a plurality of adjacently disposed mowing units. Thus, in the mowing unit illustrated in FIG. 27 an attachment yoke 201 having a pivot pin 241, is provided and carries a transverse web 202. Two slide track guides 31 permitting a pivoting in the direction of the double arrow are hitched to said transverse web 202 via four-bar linkages 242 which permit a pivoting about a transverse axis.

Figure 27:
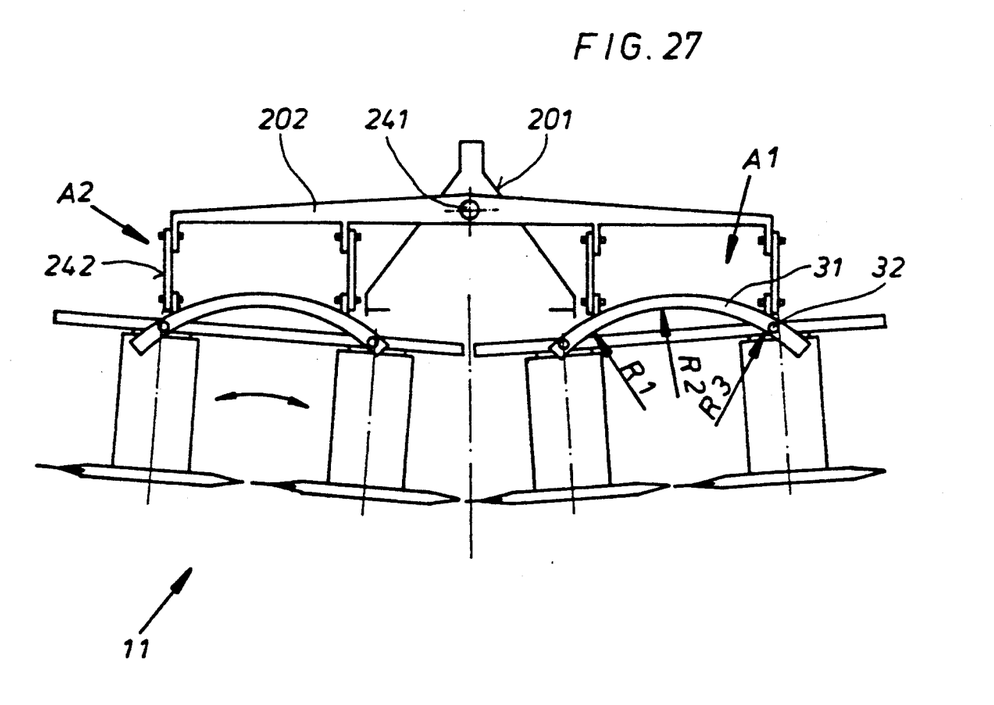
FIG. 27 shows a mowing machine equipped with a plurality of mowing units and compensating means in rear view and FIG. 28 shows a further development of a compensating means constructed as four-bar linkage.

In the right slide guide the three arrows $R_1$, $R_2$, $R_3$ indicate that the slide track 31 has curve radii differing from the arc of a circle. It is thus achieved that the lateral distance between two adjacent mowing units at the level of their ring collars at the centre plane remain unchanged even when the mowing units execute pivot movements about longitudinal axes.

Figure 28:
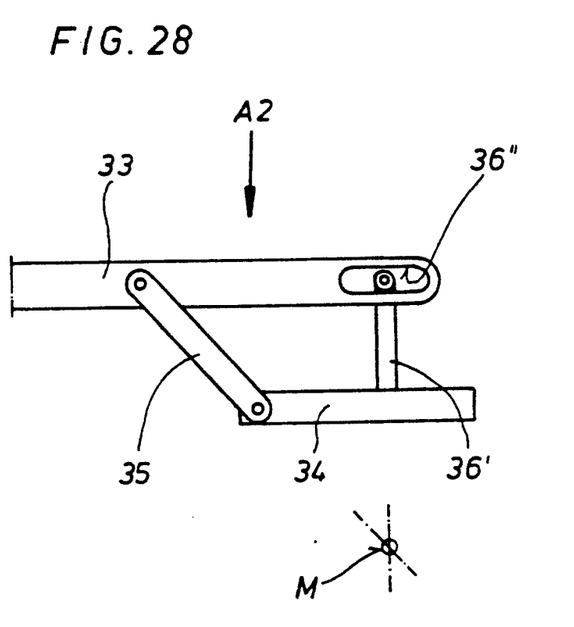

The compensating means A2 shown in FIG. 28 and consisting of a four-bar linkage is made in a similar manner to the compensating means according to FIG. 2. At the base 33 and the rocker 34 a link 35 is respectively articulately secured and a further link 36' is in contrast fixedly connected to the rocker 34 and displaceably guided in a slot 36" of the base 33. The transverse pivot axis M is defined by the intersection point of the extensions of the two links 35 and 36'.

I claim:

1. Reaping or haying machine comprising at least one rotatingly drivable mowing or raking unit (12, 22) which is provided with implements constructed as mowing blades or raking tines and defining a working plane and by means of a compensating means (A1, A2, A3, A4) is supported on a support frame (13) connectable to a tractor pivotally about at least one pivot axis extending transversely of the travelling direction, characterized in that the compensating means (A1, A2, A3, A4) is constructed in such a manner that a pivot axis of the mowing or raking unit (12, 22) lying transversely of the travelling direction extends through an instantaneous center of rotation arranged beneath the working plane.

2. Reaping or haying machine according to claim 1, characterized in that the transversely disposed pivot axis (M) extending through the instantaneous center of rotation lies in the operating position of the mowing or raking unit (12, 22) beneath the surface of the ground (10).

3. Reaping or haying machine according to claim 1 or 2, characterized in that the compensating means (A1) comprises a guide path (31) curved arcuately about the transversely disposed pivot axis (M) and at least one control body (32) guided displaceably in said path.

4. Reaping or haying machine according to claim 3, characterized in that the control body (32) comprises a roller which is guided in a slide track as guide path (31).

5. Reaping or haying machine according to claim 1 or 2, characterized in that the compensating means (A2, A3) is constructed as linkage mechanism.

6. Agricultural reaping or haying machine according to claim 5, characterized in that the linkage mechanism is constructed as four-bar linkage (33, 34, 35, 36; 42, 43, 44, 25, 26; 48, 49, 50, 51, 53, 65, 66, 72, 73, 77, 78, 81, 82, 83, 101, 102, 103, 104, 111, 113, 121, 122, 123, 131, 132, 151, 155, 242) and is arranged in such a manner that the instantaneous center of rotation thereof lies on the transversely disposed pivot axis of the compensating means.

7. Reaping or haying machine according to claim 5, characterized in that the compensating means (A3) is constructed as three-dimensional link mechanism.

8. Agricultural reaping or haying machine according to claim 5, wherein said links are interconnected by a plurality of joints, and at least one of the joints is a thrust joint (12).

9. Reaping or haying machine according to claim 5 characterized in that the support frame (13; 25) is configured as a base of the linkage mechanism and the mowing or raking unit (12; 22) as a rocker (34, 47).

10. Reaping or haying machine according to claim 9, characterized in that the links (131, 132) of the linkage mechanism are constructed as leaf springs and are fixedly clamped at the junctures of the base and the rocker.

11. Reaping or haying machine according to claim 9, characterized in that the base of the linkage mechanism formed by the support frame (13; 15) is arranged beneath above the rocker of the linkage mechanism formed by the mowing or raking unit (12; 22).

12. Reaping or haying machine according claim 9 characterized in that the base of the four-bar linkage is arranged substantially vertical and the rocker is arranged substantially horizontal.

13. Reaping or haying machine according to claim 5 characterized in that two compensating means (A2) formed by two four-bar linkages are connected together via an intermediate frame (60) to form a constructional unit.

14. Reaping or haying machine according to claims 1 or 2, characterized in that the compensating means (A4) comprises a spherically formed zone (141).

15. Reaping or haying machine according to claim 1 or 2, characterized in that the compensating means (A2) is arranged in a drum of the mowing unit (12).

16. Reaping or haying machine according to claim 1 or 2, characterized in that the transversely disposed pivot axis (M) extending through the instantaneous center of rotation extends within the vertical projection of the outer boundary of a support surface of the mowing or raking unit.

17. The reaping or haying machine according to claim 9, characterized in that the base of the linkage mechanism formed by the support frame (13,15) is arranged above the rocker of the linkage mechanism formed by the mowing or raking unit (12;22).

18. The reaping or haying machine according to claims 1 or 2 characterized in that the compensating means (A2) is arranged in the raking unit (22).

* * * * *